(12) United States Patent
Evans

(10) Patent No.: US 9,723,822 B1
(45) Date of Patent: Aug. 8, 2017

(54) FISHING ROD WITH A FLOTATION DEVICE

(71) Applicant: James Evans, Chichasaw, AL (US)

(72) Inventor: James Evans, Chichasaw, AL (US)

( * ) Notice: Subject to any disclaimer, the term of this patent is extended or adjusted under 35 U.S.C. 154(b) by 109 days.

(21) Appl. No.: 14/885,429

(22) Filed: Oct. 16, 2015

(51) Int. Cl.
*A01K 87/00* (2006.01)

(52) U.S. Cl.
CPC .................. *A01K 87/007* (2013.01)

(58) Field of Classification Search
USPC .......................................... 43/25, 23, 18.1 R
See application file for complete search history.

(56) References Cited

U.S. PATENT DOCUMENTS

| | | | | |
|---|---|---|---|---|
| 2,198,755 A * | 4/1940 | Berndt | ..................... | B63B 22/10 |
| | | | | 43/25 |
| 2,528,799 A * | 11/1950 | Strong | ................... | A01K 97/24 |
| | | | | 114/51 |
| 2,539,548 A * | 1/1951 | Norris | ..................... | A01K 97/24 |
| | | | | 441/8 |
| 2,588,637 A * | 3/1952 | Krantz | .................... | B63B 22/10 |
| | | | | 114/51 |
| 2,642,693 A * | 6/1953 | Broady | .................. | A01K 87/00 |
| | | | | 114/54 |
| 2,675,568 A * | 4/1954 | King | ....................... | A01K 97/24 |
| | | | | 43/25 |
| 2,723,404 A * | 11/1955 | Krantz | .................... | A01K 97/24 |
| | | | | 102/390 |
| 2,791,785 A * | 5/1957 | Metts | ..................... | A01K 97/24 |
| | | | | 102/390 |
| 2,806,231 A * | 9/1957 | Hofmeister | ............ | B63B 22/10 |
| | | | | 441/8 |
| 3,049,733 A * | 8/1962 | Mennenga | ............. | A01K 97/24 |
| | | | | 116/209 |
| 4,583,314 A * | 4/1986 | Kirkland | ................ | A01K 87/00 |
| | | | | 43/25 |
| 4,713,031 A * | 12/1987 | Fuller | .................... | A01K 97/00 |
| | | | | 441/23 |
| 5,156,562 A * | 10/1992 | Pearson | .................... | B63C 7/26 |
| | | | | 43/25 |
| 5,857,881 A * | 1/1999 | Zippel, Sr. | ................ | B63C 9/15 |
| | | | | 43/25 |
| 8,105,124 B2 * | 1/2012 | Williams | ................ | B63B 22/10 |
| | | | | 441/7 |
| 8,613,635 B2 * | 12/2013 | Fisher | .................... | B63B 22/12 |
| | | | | 441/2 |
| 9,277,739 B1 * | 3/2016 | Barnett | .................. | A01K 93/02 |

(Continued)

*Primary Examiner* — Christopher P Ellis
(74) *Attorney, Agent, or Firm* — Stevenson IP, LLC

(57) ABSTRACT

A fishing rod with a flotation device including a housing in a handle of a fishing rod body or in a tube attached to the fishing rod body. A flotation mechanism in the housing includes a water dissolvable plug within a front end thereof, a flotation body adjacent the plug, a discharge element, which is a spring or an amount of baking soda, adjacent a rear side of the flotation body, and a nylon cord anchored to the rear end and having a forward end attached to the flotation body rear side. Upon dissolution of the plug, the discharge element transforms from a contracted condition into an expanded condition and releases the flotation body from the housing. As the flotation body rises to and floats upon a surface of a body of water, the housing is elevated to make the fishing rod body accessible for retrieval.

4 Claims, 7 Drawing Sheets

(56) References Cited

U.S. PATENT DOCUMENTS

2007/0234632 A1* 10/2007 Strickland .............. A01K 97/00
 43/25
2011/0078938 A1* 4/2011 Aguzin ................ A01K 87/007
 43/25

* cited by examiner

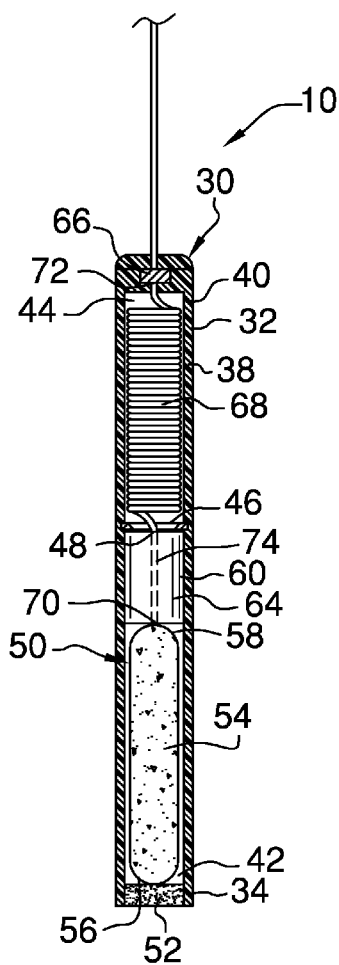
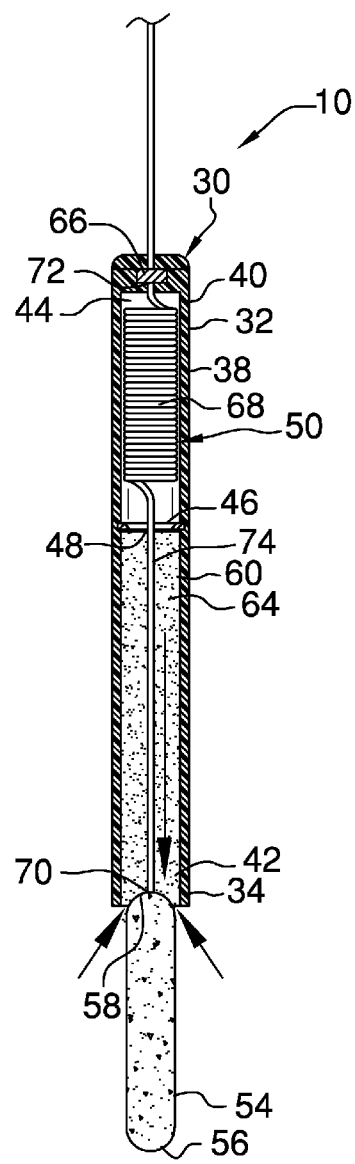
FIG. 6
FIG. 7

FISHING ROD WITH A FLOTATION DEVICE

BACKGROUND OF THE INVENTION

Various types of fishing rod retrieval devices for submerged fishing devices are known in the prior art. However, what is needed is a fishing rod with a flotation device including a housing in either a handle of the fishing rod body or in a tube attached to a rod in which a flotation mechanism for elevating the submerged fishing rod body is housed. The flotation mechanism includes a water dissolvable plug disposed within a front end of the housing, a flotation body disposed directly adjacent the plug, a discharge element, which is either a spring or an amount of baking soda, directly adjacent a rear side of the flotation body, and a length of nylon cord anchored to an anchor body on the rear end and having a forward end attached to the flotation body rear side. Upon dissolution of the plug, the discharge element transforms from acontracted condition into an alternate expanded condition and then the flotation body is released from the front end and the cord is partially extended from the front end. The flotation body is configured to rise to and float upon a surface of a body of water to elevate the housing toward the surface of the body of water thus making the fishing rod body accessible for retrieval.

FIELD OF THE INVENTION

The present invention relates to fishing rod retrieval devices, and more particularly, to a fishing rod with a flotation device.

SUMMARY OF THE INVENTION

The general purpose of the present fishing rod with a flotation device, described subsequently in greater detail, is to provide a fishing rod with a flotation device which has many novel features that result in a fishing rod with a flotation device which is not anticipated, rendered obvious, suggested, or even implied by prior art, either alone or in combination thereof.

To accomplish this, the present fishing rod with a flotation device includes a fishing rod body having a handle, a rod, and a reel mount area disposed between the handle and the rod. A housing is provided in one of the handle and alternately a portable tube attached to the rod. Each of the handle and the tube has a front end, a rear end, an outer wall continuously disposed between the front end and the rear end, and a compartment defined by the front end, the rear end, and the outer wall. The compartment has a forward portion proximal the front end, a rearward portion proximal the rear end, and a divider, with a central opening, continuously disposed between the forward portion and the rearward portion. A flotation mechanism, devised to assist in the retrieval of the fishing rod body which is submerged, is disposed within the housing. The flotation mechanism includes a water dissolvable plug disposed within the front end, a flotation body disposed directly adjacent the plug within the forward portion, and a discharge element is disposed directly adjacent a rear side of the flotation body within the forward portion. The discharge element has a contracted condition and an alternate expanded condition and is configured to expel the flotation body from the housing when the plug is dissolved. The discharge element is one of a spring disposed within the handle and alternately an amount of baking soda within the tube, but can also be any substance which has a contracted condition for storage within the forward portion and which can transform into the expanded condition and which serves to promote the functionality of the present device. A length of nylon cord is also disposed within the compartment rearward portion and is anchored to an anchor body on the rear end within the compartment rearward portion. A forward end of the cord is attached to the rear side of the flotation body. The cord is substantially in a wound condition within the compartment rearward portion when the discharge element is in the contracted condition, but the cord is extendible through the opening in the divider and outwardly through the front end when the discharge element is in the expanded condition.

Upon dissolution of the plug, the discharge element transforms from the contracted condition into the alternate expanded condition. Upon the transformation of the discharge element into the expanded condition, the flotation body is released from the forward portion of the compartment and outwardly from the front end and the cord is partially extended from the front end. Upon the release of the flotation body outwardly from the front end, the flotation body is configured to rise to and float upon a surface of a body of water. When the flotation body floats upon the surface of the body of water, the housing is elevated toward the surface of the body of water thus making the fishing rod body accessible for retrieval.

Thus has been broadly outlined the more important features of the present fishing rod with a flotation device so that the detailed description thereof that follows may be better understood and in order that the present contribution to the art may be better appreciated.

BRIEF DESCRIPTION OF THE DRAWINGS

Figures

FIG. 6 is a cross-sectional view taken along line 6-6 of FIG. 5 showing the tube having therein the plug proximal the frontal end thereof, an amount of baking soda as the discharge element in a position between the flotation body, disposed within the tube adjacent the plug, and the nylon cord disposed within and anchored to the tube proximal a rearward end of the tube.

FIG. 7 is cross-sectional taken along line 7-7 of FIG. 5 showing the baking soda as the discharge element in an expanded condition with the plug substantially displaced from the tube and the nylon cord partially extended toward the frontal end of the tube by the flotation body.

DETAILED DESCRIPTION OF THE DRAWINGS

Figure 1:
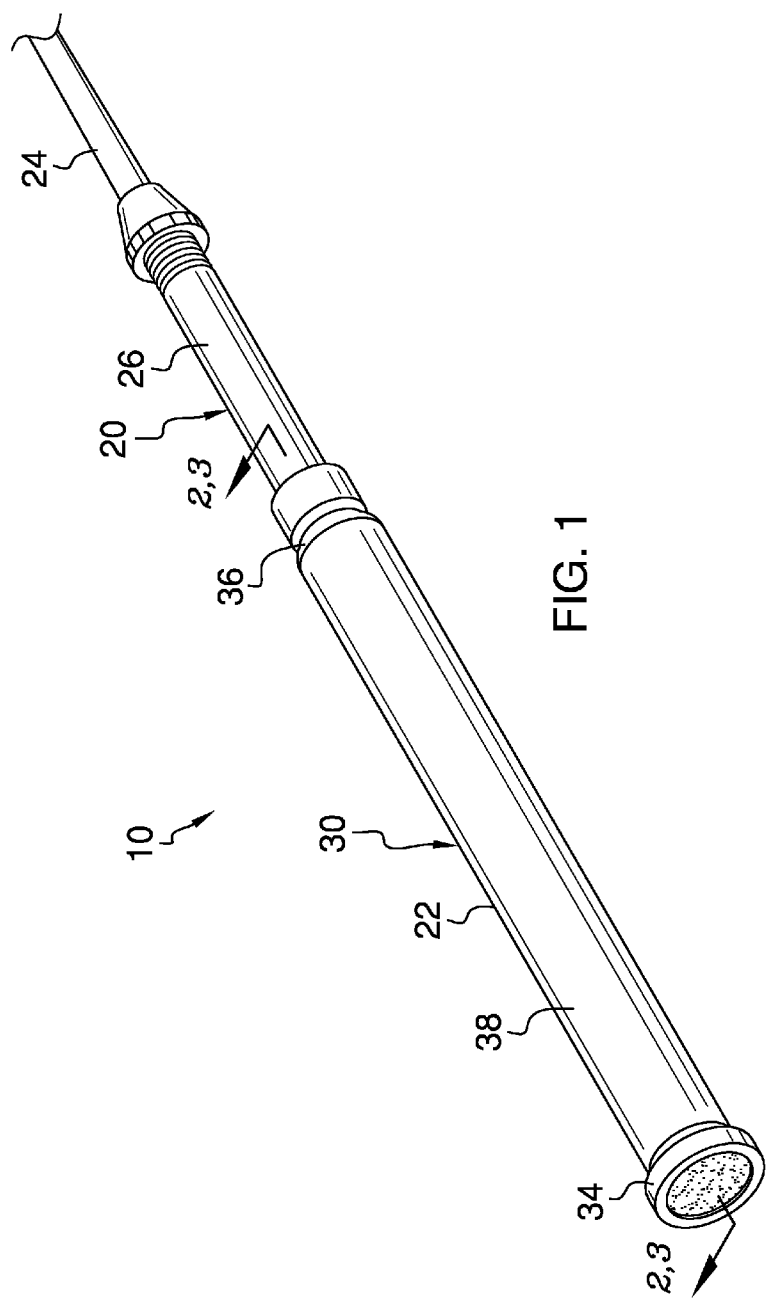
FIG. 1 is a front isometric view.

With reference now to the drawings, and in particular FIGS. 1 through 8 thereof, an example of the instant fishing rod with a flotation device employing the principles and concepts of the present fishing rod with a flotation device and generally designated by the reference number 10 will be described.

Referring to FIGS. 1 through 8 the present fishing rod with a flotation device 10 is illustrated. The fishing rod with a flotation device 10 includes a fishing rod body 20 having a handle 22, a rod 24, and a reel mount area 26 disposed between the handle 22 and the rod 24. A housing 30 is provided in one of the handle 22 and alternately a portable tube 32 attached to the rod 24. Each of the handle 22 and the tube 32 has a front end 34, a rear end 36, an outer wall 38 continuously disposed between the front end 34 and the rear end 36, and a compartment 40 defined by the front end 34, the rear end 36, and the outer wall 38. The compartment 40 has a forward portion 42 proximal the front end 34, a rearward portion 44 proximal the rear end 36, and a divider 46 continuously disposed between the forward portion 42 and the rearward portion 44. The divider 46 has an opening 48 centrally disposed therein.

Figure 2:
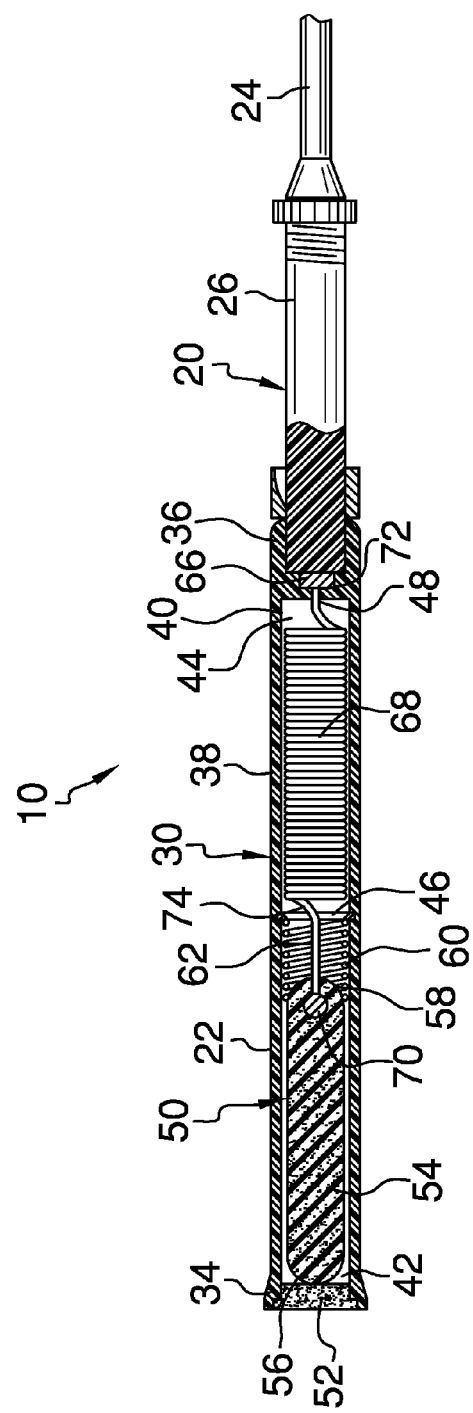
FIG. 2 is a cross-sectional view taken along line 2-2 of FIG. 1 showing a spring as a discharge element in a contracted condition with a water dissolvable plug disposed within a front end of a fishing rod handle and a flotation body disposed within the handle adjacent the plug and attached to a nylon cord disposed within and anchored to the handle proximal a front side of a reel mount area.
Figure 3:
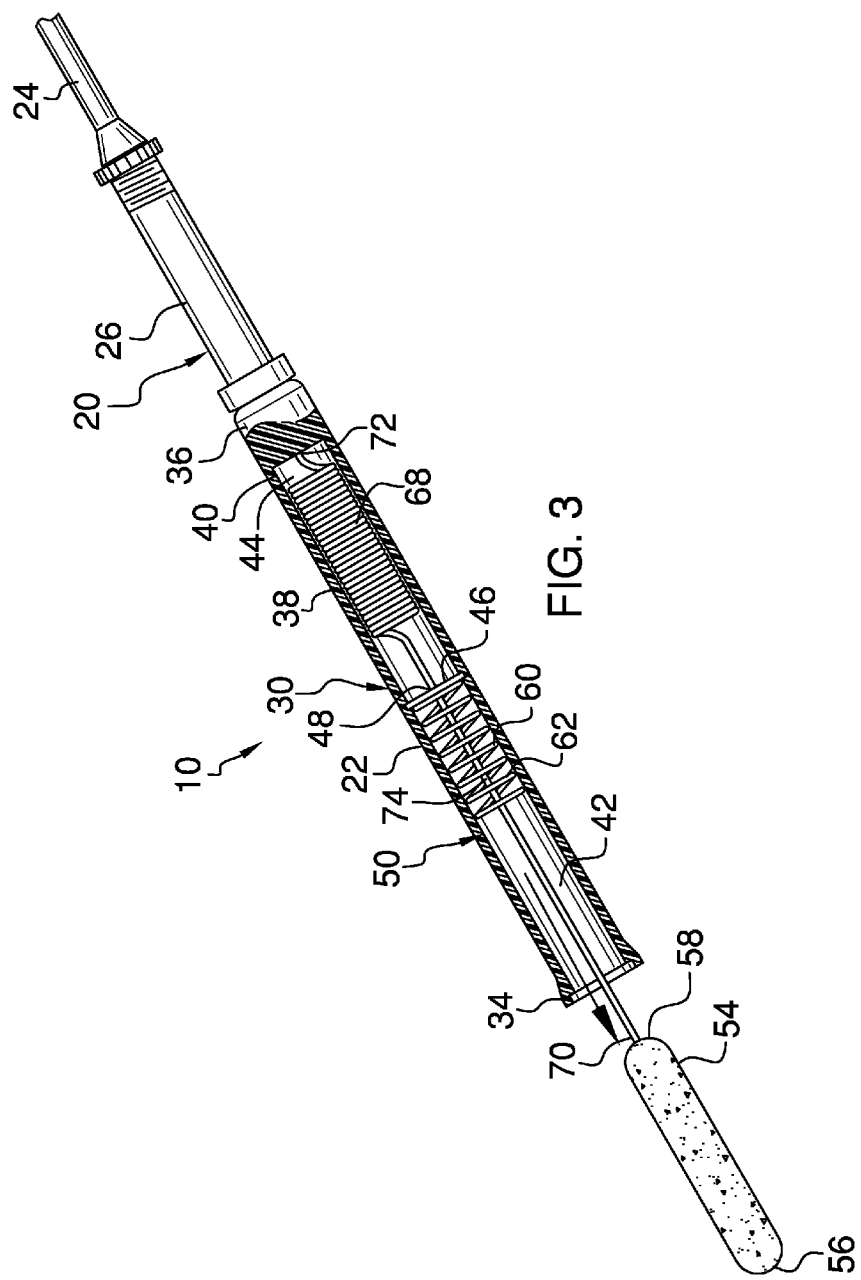
FIG. 3 is a cross-sectional view taken along line 3-3 of FIG. 1 showing the spring as the discharge element in an expanded condition with the plug displaced from the front end and the flotation body outside the handle.
Figure 4:
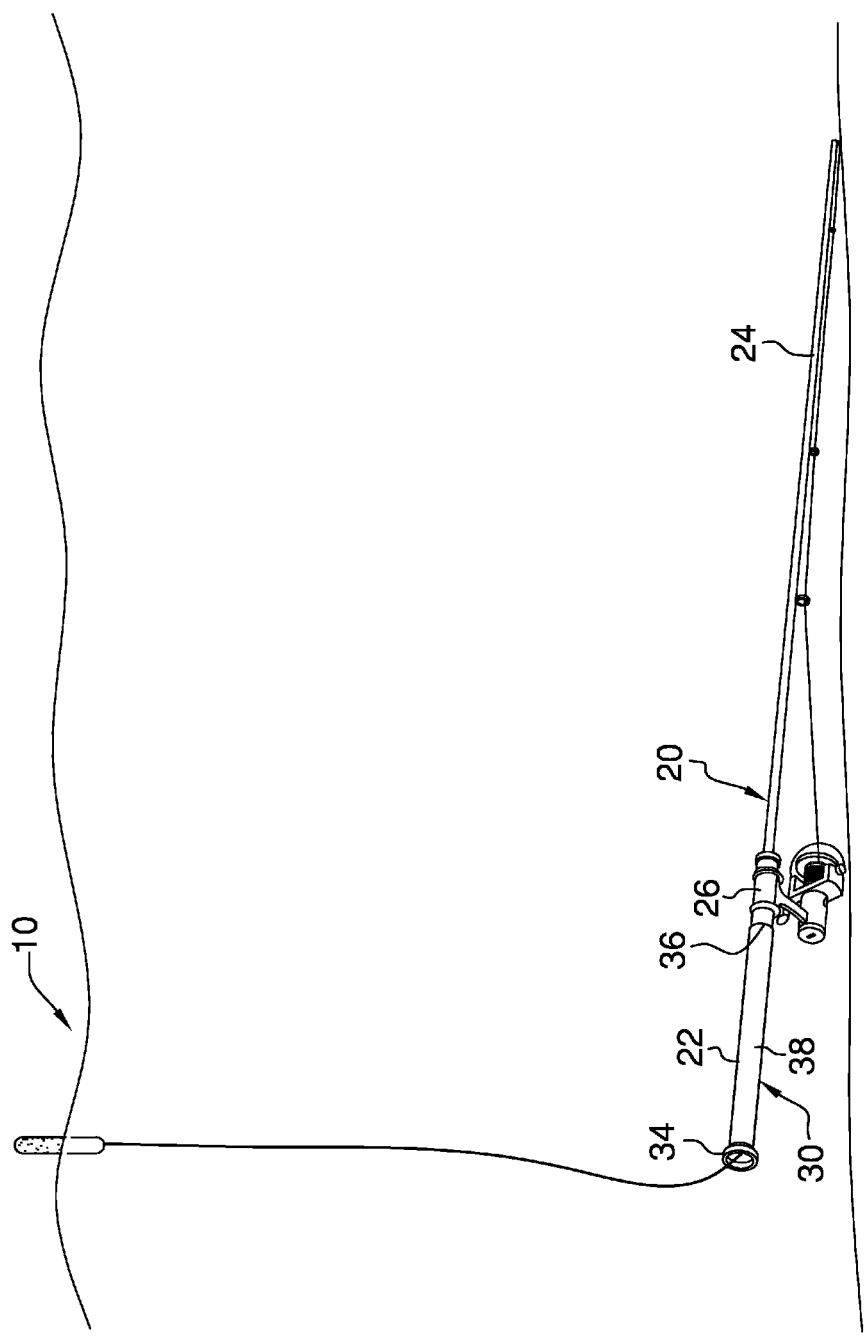
FIG. 4 is an in-use view showing the plug displaced from the front end of the handle. the flotation body floating atop a surface of a body of water, the nylon cord extended from the flotation body, and the handle in an elevated condition.
Figure 5:
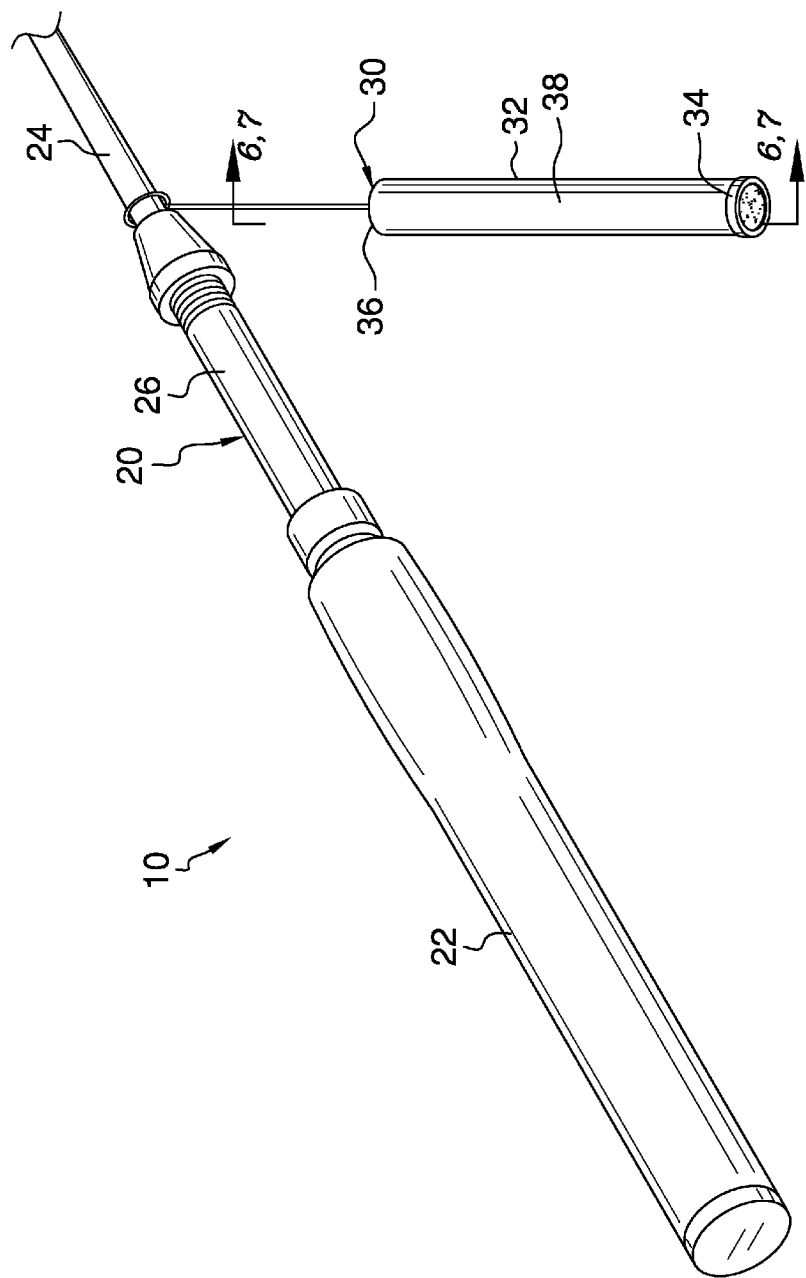
FIG. 5 is a front isometric view showing a portable tube attached to the fishing rod proximal a forward end of the reel mount area of the fishing rod and the plug disposed within a front side of the tube.
Figure 8:
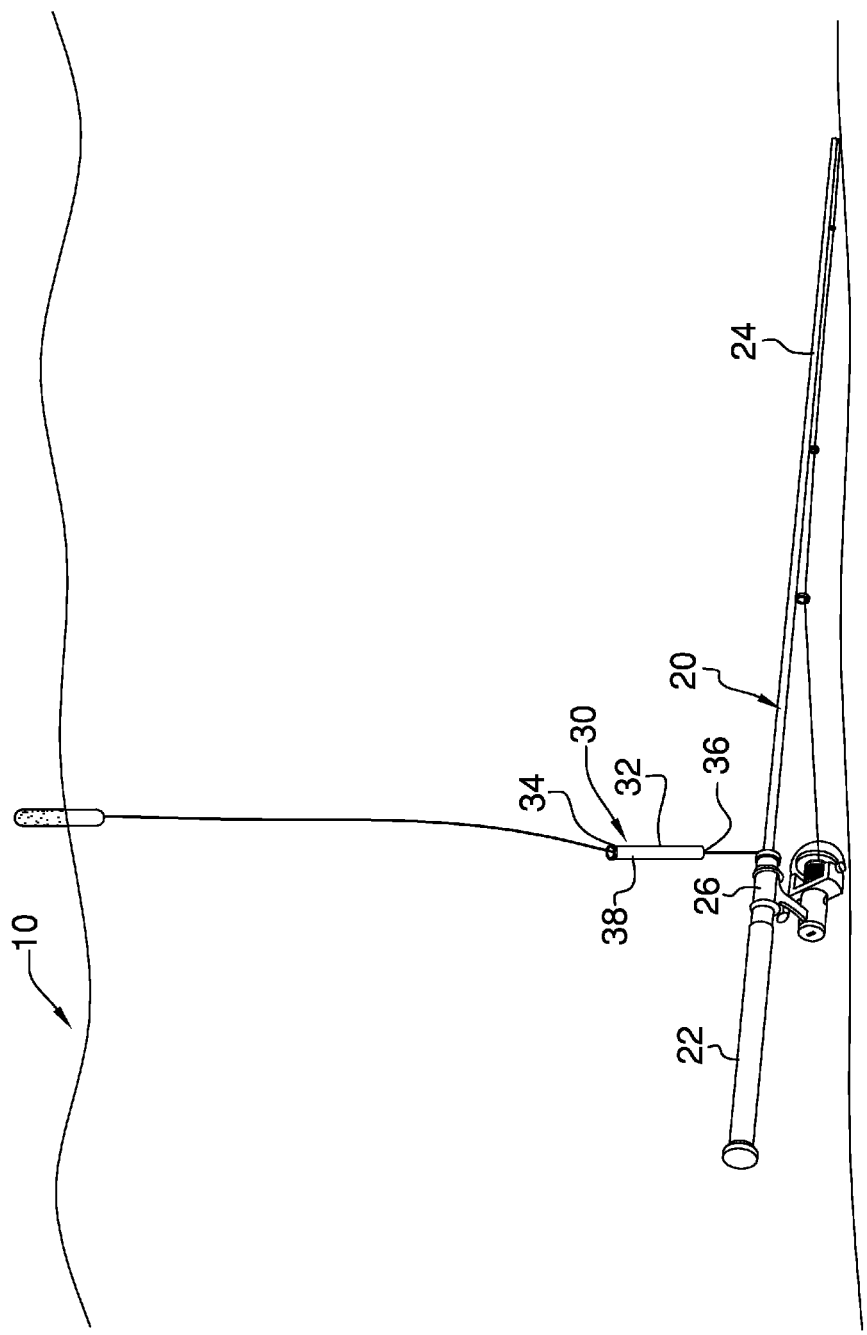
FIG. 8 is an in-use view showing the plug displaced from the frontal end of the tube, the flotation body floating atop the surface of the body of water, the nylon cord extended from the flotation body, and the handle in the elevated condition.

A flotation mechanism 50, devised to assist in the retrieval of the fishing rod body which is submerged, is disposed within the housing 30. The flotation mechanism 50 includes a water dissolvable plug 52 disposed within the front end 34. The flotation mechanism 50 further includes a flotation body 54 disposed directly adjacent the plug 54 within the forward portion 42. The flotation body 54 has a front side 56 and a rear side 58. The flotation body 54 is configured to slidingly engage the compartment 40 forward portion 42. A discharge element 60 is disposed directly adjacent the flotation body 54 rear side 58 within the forward portion 42. The discharge element 60 is more proximal the divider 46 than the flotation body 54. The discharge element 60 has a contracted condition, as shown in FIGS. 2 and 6 and an alternate expanded condition as shown in FIGS. 3 and 7, and is configured to expel the flotation body from the housing when the plug is dissolved. The discharge element 60 is one of a spring 62 disposed within the handle 22 and alternately an amount of baking soda 64 within the tube, but can also be any substance which has a contracted condition for storage within the forward portion 42 and which can transform into the expanded condition and which serves to promote the functionality of the present device 10. An anchor body 66 is disposed on the rear end 36 within the compartment 40 rearward portion 44. A length of nylon cord 68 is also disposed within the compartment 40 rearward portion 44. The cord 68 has a forward end 70 attached to the rear side 58 of the flotation body 54, a rearward end 72 attached to the anchor body, and a middle portion 74 disposed within the compartment 40. The cord is substantially in a wound condition within the compartment 40 rearward portion 44 when the discharge element 60 is in the contracted condition, but the cord 68 is extendible through the opening 48 in the divider 46 and outwardly through the front end 34 when the discharge element is in the expanded condition.

Upon dissolution of the plug 52, the discharge element 60 transforms from the contracted condition into the alternate expanded condition. Upon the transformation of the discharge element 60 into the expanded condition, the flotation body 54 is released from the forward portion 42 of the compartment 40 and outwardly from the front end 34 and the cord 68 is partially extended from the front end 34. Upon the release of the flotation body 54 outwardly from the front end 34, the flotation body 54 is configured to rise to and float upon a surface of a body of water. When the flotation body 54 floats upon the surface of the body of water, the housing 30 is elevated toward the surface of the body of water thus making the fishing rod body 20 accessible for retrieval.

What is claimed is:
1. A fishing rod with a flotation device comprising:
a fishing rod body having a handle, a rod, and a reel mount area disposed between the handle and the rod;
a housing comprising one of the handle and alternately a portable tube attached to the rod, each of the handle and the tube having a front end, a rear end, an outer wall continuously disposed between the front end and the rear end, and a compartment defined by the front end, the rear end, and the outer wall; the compartment having a forward portion proximal the front end, a rearward portion proximal the rear end, and a divider continuously disposed between the forward portion and the rearward portion, the divider having an opening centrally disposed therein;
a flotation mechanism disposed within the housing, the flotation mechanism comprising:
a water dissolvable plug disposed within the front end;
a flotation body disposed directly adjacent the plug within the forward portion, the flotation body having a front side and a rear side, the flotation body being configured to slidingly engage the compartment forward portion;
a discharge element disposed directly adjacent the flotation body rear side within the forward portion, the discharge element being more proximal the divider than the flotation body, the discharge element having a contracted condition and an alternate expanded condition and configured to expel the flotation body from the housing when the plug is dissolved;
an anchor body disposed on the rear end within the compartment rearward portion; and
a length of cord disposed within the compartment rearward portion, the cord having a forward end attached to the rear side of the flotation body, a rearward end attached to the anchor body, and a middle portion disposed within the compartment, the cord being substantially in a wound condition within the compartment rearward portion when the discharge element is in the contracted condition, the cord being extendible through the opening in the divider and outwardly through the front end;
wherein upon dissolution of the plug, the discharge element transforms from the contracted condition into the alternate expanded condition;
wherein upon the transformation of the discharge element into the expanded condition, the flotation body is released from the forward portion of the compartment outwardly from the front end and the cord is partially extended from the front end;
wherein upon the release of the flotation body outwardly from the front end, the flotation body is configured to rise to and float upon a surface of a body of water; and wherein when the flotation body floats upon the surface of the body of water, the housing is elevated toward the surface of the body of water.

2. The fishing rod with a flotation device of claim 1 wherein the discharge element is one of a spring disposed within the handle and alternately an amount of baking soda within the tube.

3. The fishing rod with a flotation device of claim 1 wherein the cord is nylon.

4. The fishing rod with a flotation device of claim 2 wherein the cord is nylon.

* * * * *